Figure 1:
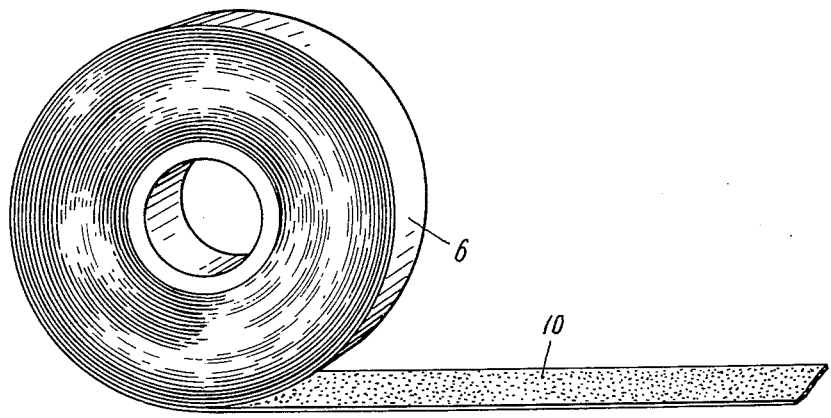
Figure 2:
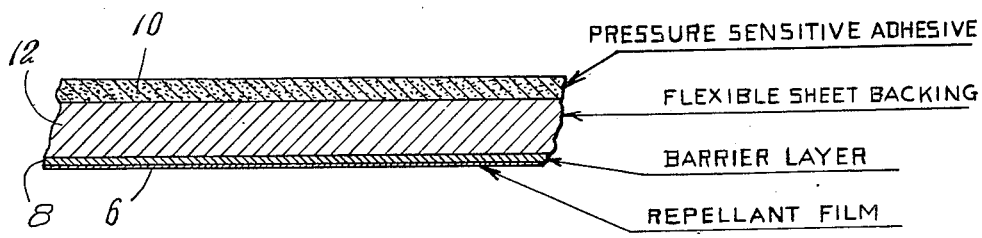

Jan. 4, 1949.  H. N. HOMEYER, JR  2,458,166
COMPOSITE PRESSURE-SENSITIVE
ADHESIVE SHEET MATERIAL
Filed June 27, 1944

Inventor.
Henry N. Homeyer, Jr.
Rowland V. Patrick
Attorney.

Patented Jan. 4, 1949

2,458,166

UNITED STATES PATENT OFFICE 2,458,166

COMPOSITE PRESSURE-SENSITIVE ADHESIVE SHEET MATERIAL

Henry N. Homeyer, Jr., Elmhurst, Ill., assignor to The Kendall Company, Boston, Mass., a corporation of Massachusetts Application June 27, 1944, Serial No. 542,399

8 Claims. (Cl. 117—68.5)

This invention relates to pressure-sensitive adhesive sheet materials and more particularly to composite pressure-sensitive adhesive sheet materials having superior stability under ordinary and unusual conditions of storage and use, particularly industrial use.

The varied uses to which pressure-sensitive adhesive sheet materials, especially industrial masking tapes are put, subject the sheets to all kind of deleterious exterior influences which tend to cause gradual or sudden deterioration of the composite sheets by reason of breakdown of the backing or of the adhesive or of both with resulting loss of the fundamental function of the sheets in use, namely to provide a firmly adherent integral removable mask or tape binder. For instance, outdoor use entails exposure of the backing to direct sunlight which is the cause of many tape failures by reason of harmful rays striking through the relatively permeable backing. Temperature extremes, variable humidity conditions, wetting by rain, seas and other liquids are also encountered in outdoor use and elsewhere, and all take their toll of commercial tapes containing adhesives which, because they are formulated to retain pressure-sensitivity, are unavoidably unstable under such severe conditions and therefore fail. It has therefore been a matter of primary concern to pressure-sensitive adhesive sheet manufacturers to produce a product that had long life in storage and would better resist these influences and thus give more satisfactory performance.

This invention has as its chief object the production of a composite pressure-sensitive adhesive sheet material comprising a relatively permeable backing material such as woven or unwoven fabric, or paper, bearing on one side thereof a layer of a pressure-sensitive adhesive, and on the other side a coating which resists these deleterious influences and thus simultaneously protects the pressure-sensitive adhesive which underlies the backing both during storage in roll form and in use.

However, the choice of a back coat material as one component of a pressure-sensitive adhesive tape involves many pitfalls. Among the important considerations involved are the following:

1. When adhesive tape is in roll form, an overlying convolution of the tape has its pressure-sensitive adhesive surface in direct contact with the back of a preceding convolution. If the adhesive has a tendency to adhere to this back surface of a preceding convolution with as great tenacity as it does to the other surface of the backing (to which it was applied), the tape cannot be unwound satisfactorily. Usually the layer of adhesive will delaminate ruining the tape. Where the backing is relatively weak—for instance paper—the backing will also relaminate. Back surfaces of successful tapes should therefore possess characteristics that prevent any such harmful degree of tenacity. They should be relatively repellent to the adhesive.

2. If a backing contains an ingredient chemically deleterious to the pressure-sensitive qualities of the adhesive—e. g. a plasticizer—it may be present adjacent the back surface in such quantities that it migrates into the adhesive in sufficient quantity to harmfully attack the adhesive. Such migration will occur in roll form directly from the back surface to the adhesive and, in the case of pervious backing such as cloth or even some papers, in either flat or roll form, across the interface between the adhesive layer and the backing (i. e. striking through the cloth interlayer).

The above requirements greatly restrict the number of materials which can be used for back coats and eliminate many materials which, in the absence of the pressure-sensitive adhesive, would qualify as suitable for imparting protective qualities to the sheeting. Ideal suitability insofar as the sheeting is concerned is a treatment which provides moisture resistance, solvent resistance, and heat resistance, without seriously interfering with the flexibility and deformability of the sheet. Moisture resistance depends to a large degree upon impermeability, but when impermeability is sought, optimum deformability, especially in cloth backings, is sacrificed.

Rubber and latex exhibit qualities indicative of suitability as back coatings. Coatings thereof may be made which are soft, dry, flexible, and impart adequate moisture resistance. However, most pressure-sensitive adhesives contain rubber, latex and/or resins, and have such affinity for any rubber material that the terrific pull exerted by the aggresive adhesives will easily strip a rubber back coat off the backing sheet when a roll is unwound.

A second class of possible protective back coats are materials repellent to rubber, such as nitrocellulose, ethyl cellulose, celluose acetate. But these materials, while possessing adequate repellency to the ordinary type of rubber-resin pressure-sensitive adhesive, have to be highly plasticized when used as repellent coats on flexible backings in order to maintain flexibility in the composite material. Unfortunately, the plasticizers used are compatible with the rubber pressure-sensitive adhesives. Consequently, with a plasticized cellulosic repellent coat of a thickness sufficient to give impermeability, a considerable quantity of plasticizer is present to migrate from the repellent coat to the adhesive coat. Such migration is accelerated at tropical temperatures. Its effect is to lessen the amount of plasticizer in the repellent coat, which will thus stiffen, and to increase the amount of plasticizer in the adhesive layer, softening it and making it mushy. If the plasticizer is cut down to avoid migration, the repellent coat will be undesirably stiff and render the sheet non-deformable. Moreover, the above recited cellulosic coat materials, while they provide water resistant films, do not provide impermeability to water vapor. Under open air moist conditions, coatings of such materials do not afford a desirable degree of protection. Also, these coatings are not resistant to many of the solvents which are present in lacquers and paints.

Attempts have been made to overcome the respective deficiencies of these two classes of materials by using layers of both—overlying a rubber coat with a repellent coat. Suggestion of such an overlying repellent coat does not however solve the difficulty because if the repellent is chosen for its good qualities of repellency towards the pressure-sensitive adhesive, it will exhibit a same repellency to the latex or rubber coat. Hence the protective repellent coat will exhibit no greater adhesion to the rubber coat than it does to the pressure-sensitive adhesive layer and delamination between the repellent coat and the rubber coat will occur on unwinding the tape from roll form. The more the repellent coat is designed to adhere to the rubber coat, the more it will adhere to the layer of adhesive and the less its repellency towards the adhesive layer.

Van Cleef Patent No. 2,229,316 recognizes the difficulty of anchoring such a repellent coat to a rubber coat and had to go to the complicated expedient of providing a graduated multi-layer back coating running from rubber to ethyl cellulose in order to obtain adequate anchorage of the surface layer. Such multi-layer treatment because of its multi-step complication is costly and also builds up the thickness of the backing excessively. Moreover, the tape is still subject either to undesirable stiffness and non-deformability or else to plasticizer migration.

I have discovered that cellulose derivatives such as ethyl cellulose, nitrocellulose and cellulose acetate, and polyvinyl esters, such as polyvinyl acetate, vinyl acetate-chloride copolymers and polyvinyl chloride, though they have, as coatings, a well-known marked repellency to natural rubber and latex, have an entirely unexpected and almost unbelievable affinity for certain materials commonly accepted as being very closely related to natural rubber, namely Buna N (copolymer of butadiene and acrylic nitrile) particularly and also polychloroprene. This invention utilizes these discoveries by affixing to a tape backing a coat of a synthetic rubber of one of the particular types towards which these coating materials exhibit this peculiar affinity. Such coat provides suitable impermeability and water resistance without effecting deformability. I then superpose on this impermeable coat a repellent film of nitrocellulose or other material repellent to natural rubber and of the type heretofore described.

Because these materials adhere so strongly to the underlying coat, a single coat thereof forms a film which has adequate direct adhesion to the underlying coat to prevent delamination therebetween during handling; and because I rely on the superposed coat only to provide repellency to the adhesive, and not to provide impermeability, I can make this single-layer superposed coat or film exceedingly thin—so thin that it has no adverse effect on deformability even without a plasticizer—and if a plasticizer is present, the amount of plasticizer is so small per square yard that, in roll form, migration of the plasticizer, though compatible with the adhesive, to the adhesive, cannot be detected.

Striking of any plasticizer contained in the repellent film through the backing is barred by the interposed layer of Buna N, and the Buna N layer contains no extractable plasticizer or other ingredient which can strike through to affect deleteriously the pressure-sensitive qualities of the adhesive.

As an example of my invention, I prepare a compound as follows:

| | Parts by weight |
|---|---|
| Synthetic rubber—Hycar O. R. 15—Hycar Chemical Company (Buna N) | 2 |
| Reinforcing filler (zinc oxide) | 1 |
| Anti-oxidant | q. s. |

Compounding may be readily accomplished by breaking down the Buna N on a cold mill, as by 8 to 10 passes until it is smooth, after which the reinforcing filler is added on the mill which is then brought to an elevated temperature, for example, 220° F.

This material may then be calendered onto one surface of a paper or cloth backing or may be spread thereon by a solvent or dispersion technique. For calendering on cloth, I can recommend use of a three roll calender with the top roll at 250° F., the center roll at 140° F., and the bottom roll at 150° F.

Other butadiene-acrylic nitrile copolymer rubbers may be used, for instance, those having a less nitrile content than Hycar O. R. 15, such as Hycar O. R. 25 (Hycar Chemical Company) or Perbunan. It is my understanding that Hycar O. R. 15 has a higher nitrile content than Hycar O. R. 25 and that Perbunan, a product of Standard Oil Company of New Jersey, has a less nitrile content than Hycar O. R. 25.

Other satisfactory fillers and extenders are Titanox A (titanium dioxide) and various grades of factice. Exemplary formulae are:

| | Parts by weight | |
|---|---|---|
| Hycar O. R. 15 | 150 | 150 |
| Titanox A | 25 | 125 |
| Zinc oxide | 75 | --- |
| Neofax (vulcanized vegetable oil) Stamford Rubber Supply Company | 100 | --- |

For solvent spreading, benzol or a mixture of benzol and ethyl acetate is suitable.

Chloroprene requires less filler than the Buna N type rubbers and can be formulated for solvent spreading as follows:

| | Parts by weight |
|---|---|
| Chloroprene (neoprene GN) | 120 |
| Titanox A | 6 |
| Benzol | 320 |

After this protective layer has been coated on the back, I superpose thereon an exceedingly thin single-layer top coat or film of a material repellent to natural rubber pressure-sensitive adhesives, as hereinafter disclosed. By exceedingly thin I mean a thickness not exceeding half a mil. Such a film will require only about one-fourth to one-half ounce of repellent material per square yard of backing. My preferred materials are solvent spread, and are exemplified by the following preparations:

*Example A*

| | Parts by weight |
|---|---|
| Nitrocellulose (300 c. p. viscosity) | 200 |
| Plasticizers (Tricresyl phosphate) | 150 |
| Pigment (Titanox A) | 50 |
| Solvent (Acetone) | 1500 |

*Example B*

| | |
|---|---|
| Ethyl cellulose (150 c. p. viscosity) | 100 |
| Plasticizer (Dow No. 6—Di-(ortho xenyl) Monophenyl Phosphate | 50 |
| Solvent: | |
| Toluene | 800 |
| Ethyl alcohol | 200 |

*Example C*

| | Parts by weight |
|---|---|
| Vinyl chloride-acetate copolymer (Vinylite VYHH—Carbide and Chemical Corp.) | 100 |
| Plasticizer (Santicizer B-16—ethyl phthalate ethyl glycollate) | 100 |
| Pigment (Titanox A) | 25 |
| Solvent (Ethyl acetate) | 500 |

Other materials forming satisfactory repellent films may be cellulose acetate, polyvinyl butyral, zein, acrylates, and phenol-formaldehyde tung oil compositions.

The pressure-sensitive adhesive may be a rubber-resin adhesive such as the following:

| | Parts |
|---|---|
| Rubber | 30 |
| Resin | 30 |
| Zinc-oxide | 28 |
| Mineral oil | 8 |

Or, the pressure sensitive adhesive may be one compounded from synthetic rubbers, such as GR-S (butadiene-styrene co-polymer) or polybutene, with or without natural rubber; or from reclaim rubber or latex.

Such a pressure-sensitive adhesive may be calender spread to provide an adhesive layer having a thickness of about 5 mils.

The total thickness for adhesive tape prepared in accordance with the teachings of this invention may thus be:

| | Inches |
|---|---|
| Pressure-sensitive adhesive layer | .005 |
| Barrier layer | .002 |
| Repellent film | .0005 |
| | 1.0075 |

[1] Plus cloth or paper thickness.

The unexpected results of this invention are probably founded upon the peculiar molecular properties of the materials which are utilized to form the barrier layer. These properties distinguish these materials as a class from natural rubber, polyisobutylene, reclaim rubber, and other elastomers commonly found in pressure-sensitive adhesives. The elastomers which I use comprise molecules containing polar groups and possessing finite electric moments; they are polar elastomers. Similarly, my repellent film materials are semi-polar having polar groups in non-polar chains. On the other hand, natural rubber is non-polar; its molecules have a zero electric moment; and it is classified as a non-polar elastomer along with latex, butadiene-styrene co-polymer and polybutene.

According to present understanding of polar materials, they assert an attraction towards each other and tend to stick to each other. On the other hand, non-polar materials are repelled by polar and semi-polar materials and tend not to stick to them with as great affinity as do polar materials to one another.

A theoretical analysis of a tape made in accordance with this invention supports the results secured as follows:

As shown in the drawing, a semi-polar material forming repellent film 6 is superposed on a polar elastomer forming barrier layer 8. These two materials have strong attraction for each other and adhere together well. The pressure-sensitive adhesive layer 10 contains a non-polar elastomer-rubber. The layer 10 therefore does not stick to the repellent film 6 with as great affinity as the repellent film 6 sticks to the barrier layer 8. Favorable unrolling is thus accomplished without splitting the exceedingly thin repellent film 6 from the barrier layer 8, which barrier layer in turn is firmly anchored to the cloth or paper backing 12. No priming coat need therefore be interposed between the pressure-sensitive layer 10 and the backing 12, and both the pressure-sensitive adhesive layer 10 and composite back layers 6 and 8 will have greater affinity for the backing 10 than they have for each other.

It is only by resort to some such theory as that above advanced that any satisfactory explanation can be given for the surprising adherence secured between the repellent film 6 and the barrier layer 8 considering the accepted understanding that materials such as Buna N and polychloroprene are elastomers partaking of a great many of the characteristics of natural rubber. The normal expectation would be that these materials would not perform any differently than rubber or latex.

While the invention is particularly useful in connection with relatively permeable backing materials, certain of its advantages render it useful where the backing material is a relatively impermeable membranaceous sheet material, for instance as a means for securing better adhesion of repellent material to the membranaceous sheet.

I claim:

1. A pressure-sensitive adhesive sheet material comprising a flexible sheet backing, a layer of an exposed pressure-sensitive rubber adhesive adherent to one surface of said backing, a flexible barrier layer comprising a butadiene-acrylic nitrile co-polymer elastomer adherent to the other surface of the backing, and a thin flexible film of a material repellent to said pressure-sensitive rubber adhesive layer selected from the group consisting of cellulose esters, cellulose ethers, polyvinyl esters, and polyvinyl butyral, adherently superposed on said barrier layer.

2. A pressure-sensitive adhesive sheet material comprising a flexible sheet backing, a layer of an exposed pressure-sensitive rubber adhesive adherent to one surface of said backing, a flexible barrier layer consisting essentially of butadiene acrylic nitrile co-polymer elastomer and filler adherent to the other surface of the backing, and a thin flexible film of a material repellent to said pressure-sensitive rubber adhesive layer selected from the group consisting of cellulose esters, cellulose ethers, polyvinyl esters, and polyvinyl butyral, adherently superposed on said barrier layer.

3. A pressure-sensitive adhesive sheet material comprising a flexible sheet backing, a layer of an exposed pressure-sensitive rubber adhesive adherent to one surface of said backing, a flexible barrier layer comprising a polychloroprene elastomer adherent to the other surface of the backing, and a thin flexible film of a material repellent to said pressure-sensitive rubber adhesive layer selected from the group consisting of cellulose esters, cellulose ethers, polyvinyl esters, and polyvinyl butyral, adherently superposed on said barrier layer.

4. A pressure-sensitive adhesive sheet material comprising a flexible relatively permeable sheet backing, an exposed natural rubber pressure-sensitive adhesive layer adherent to one surface of said backing, a flexible relatively impermeable barrier layer comprising butadiene-acrylic nitrile copolymer adherent to the other surface of the backing, and a thin flexible cellulose ester film adherently superposed on said barrier layer.

5. A pressure-sensitive adhesive sheet material comprising a flexible sheet backing, an exposed pressure-sensitive rubber adhesive layer adherent to one surface of said backing, a flexible relatively impermeable barrier layer comprising unplasticized butadiene-acrylic nitrile co-polymer adherent to the other surface of the backing, and a thin flexible plasticized cellulose ester film repellent to said pressure-sensitive rubber adhesive layer adherently superposed on said barrier layer in an amount less than one-half ounce per square yard of backing.

6. A pressure-sensitive adhesive sheet material comprising a flexible sheet backing, an exposed pressure-sensitive rubber adhesive layer adherent to one surface of said backing, a flexible relatively impermeable barrier layer of unplasticized butadiene-acrylic nitrile co-polymer adherent to the other surface of the backing, and a thin flexible plasticized polyvinyl ester film repellent to said pressure-sensitive rubber adhesive layer adherently superposed on said barrier layer in an amount less than one-half ounce per square yard of backing.

7. A pressure-sensitive adhesive sheet material comprising a flexible sheet backing, a layer of an exposed pressure-sensitive rubber adhesive adherent to one surface of said backing, a flexible relatively impermeable barrier layer comprising an elastomer selected from the group which consists of butadiene-acrylic nitrile co-polymer and polychloroprene adherent to the other surface of the backing, and a thin flexible film of a material repellent to said pressure-sensitive rubber adhesive layer selected from the group consisting of cellulose esters, cellulose ethers, polyvinyl esters, and polyvinyl butyral, adherently superposed on said barrier layer.

8. A pressure-sensitive adhesive sheet material comprising a flexible sheet backing, an exposed pressure-sensitive rubber adhesive layer adherent to one surface of said backing, a flexible relatively impermeable barrier layer comprising unplasticized butadiene-acrylic nitrile co-polymer adherent to the other surface of the backing, and a thin flexible plasticized cellulose ether film repellent to said pressure-sensitive rubber adhesive layer adherently superposed on said barrier layer in an amount less than one-half ounce per square yard of backing.

HENRY N. HOMEYER, JR.

REFERENCES CITED

The following references are of record in the file of this patent:

UNITED STATES PATENTS

| Number | Name | Date |
|---|---|---|
| 2,253,922 | Van Cleef | Aug. 26, 1941 |
| 2,269,712 | Drew | Jan. 13, 1942 |
| 2,295,613 | Stillwell | Sept. 15, 1942 |